(12) United States Patent
Rebick et al.

(10) Patent No.: US 7,607,678 B2
(45) Date of Patent: Oct. 27, 2009

(54) TRAILER HITCHING MACHINE

(76) Inventors: Michael S Rebick, 12209 Fairway Dr., Little Rock, AR (US) 72212; Ivan Lopes, 277 Hillvale Garden Trail, Hot Springs, AR (US) 71901

( * ) Notice: Subject to any disclaimer, the term of this patent is extended or adjusted under 35 U.S.C. 154(b) by 534 days.

(21) Appl. No.: 11/308,246

(22) Filed: Mar. 14, 2006

(65) Prior Publication Data

US 2007/0216135 A1 Sep. 20, 2007

(51) Int. Cl.
*B60D 1/40* (2006.01)
(52) U.S. Cl. .................. 280/478.1; 280/491.3; 280/511
(58) Field of Classification Search .................. 280/477, 280/478.1, 479.2, 479.3, 480, 480.1, 491.4, 280/511, 491.3
See application file for complete search history.

(56) References Cited

U.S. PATENT DOCUMENTS

| | | | |
|---|---|---|---|
| 3,740,078 A * | 6/1973 | Murr .................. | 280/478.1 |
| 3,871,535 A * | 3/1975 | Fenske .................. | 414/563 |
| 4,073,508 A * | 2/1978 | George et al. .................. | 280/478.1 |
| 4,417,748 A | 11/1983 | Dortch | |
| 4,657,275 A | 4/1987 | Carroll | |
| 4,744,583 A * | 5/1988 | Blackwood .................. | 280/479.3 |
| 4,854,604 A | 8/1989 | Stallsworth | |
| 4,871,185 A | 10/1989 | Chakroff et al. | |
| 5,048,854 A * | 9/1991 | Clark .................. | 280/477 |
| 5,277,446 A * | 1/1994 | Hamel .................. | 280/477 |
| 5,516,139 A | 5/1996 | Woods | |
| 5,529,330 A | 6/1996 | Roman | |
| 5,547,210 A | 8/1996 | Dugger | |
| 5,549,316 A | 8/1996 | Jones | |
| 5,725,232 A | 3/1998 | Fleming | |
| 5,779,256 A | 7/1998 | Vass | |
| 5,797,616 A | 8/1998 | Clement | |
| 5,975,552 A * | 11/1999 | Slaton .................. | 280/478.1 |
| 6,234,510 B1 | 5/2001 | Hammons | |
| 6,511,089 B1 * | 1/2003 | Kores, Sr. .................. | 280/478.1 |
| 7,290,755 B1 * | 11/2007 | Thibodeaux .................. | 254/323 |
| 7,309,076 B2 * | 12/2007 | Allen .................. | 280/477 |
| 2006/0103111 A1 * | 5/2006 | Popham .................. | 280/478.1 |
| 2006/0163841 A1 * | 7/2006 | Krstovic .................. | 280/478.1 |

* cited by examiner

*Primary Examiner*—Anne Marie Boehler
(74) *Attorney, Agent, or Firm*—Joe D. Calhoun

(57) ABSTRACT

A trailer hitching machine including a trailer hitch with a ratcheting pulley system, and support plates cooperating in mechanical linkage to provide a hitch ball with additional rearward extension and sideways sweep.

18 Claims, 18 Drawing Sheets

TRAILER HITCHING MACHINE

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

1. Field of the Invention

This invention generally relates to hitching a trailer behind a towing vehicle. The present invention is directed primarily towards tongue-and-ball type trailer hitches (also known as ball-and-socket type trailer hitches), and more particularly to an extendable hitching machine with a hitch ball. The extendable hitching machine can be manually extended rearward and sideways so that the hitch ball is aligned beneath the tongue of the trailer to be towed; once the trailer tongue is lowered over the hitch ball and engaged, the mated tongue-and-ball can be mechanically pulled close so that the hitching machine can be locked in its fully-retracted towing configuration.

2. Description of Related Art Including Information Disclosed 37 CFR 1.97 and 1.98

Most commercial hitches have always utilized a tongue-and-ball connection wherein the ball is mounted in an upstanding manner on the towing vehicle, to be received and seated within an inverted socket on the trailer tongue. Trailers which have carried light tongue weights are not difficult to mount on the ball, since they can be easily lifted manually and guided over to engagement with the ball. However, trailers with higher tongue loads are very difficult to manually hitch to a stationary towing vehicle, but rather require the towing vehicle to maneuver the ball precisely under the stationary inverted socket of the tongue and then lower the tongue into engagement with the ball through the use of a screw jacket or similar device. When an individual attempts the vehicle alignment, it becomes very difficult since the individual cannot see from the driver's seat the alignment of the tongue and ball.

Devices to facilitate alignment of hitches and trailers have been available for several years. Known in the art are the following, arguably related to the patentability of the present invention: U.S. Pat. Nos. 5,547,210 issued to Dugger; 5,011,176 to Eppinette; 4,944,525 to Landry; 5,342,076 to Swindall; 3,860,267 to Lyons; 4,991,865 to Francisco; 3,191,967 to Penk; 3,126,210 to Hill; 3,622,182 to Grosse-Rhode; 5,344,175 to Speer; 4,951,957 to Gullickson; 5,322,315, to Carsten; 4,792,153, to Galdes; and 4,211,428 to Barcus. None of the previous trailer hitch devices appear, however, to disclose a trailer hitching machine having a ball which is extendible both rearward and sideways in infinitely variable increments, and that facilitates movement of the trailer to the towing vehicle.

U.S. Pat. No. 5,547,210 issued to Dugger discloses a trailer hitch assembly comprising a pivoting sleeve downstanding below an arm received within a vehicle's trailer hitch receiver; the sleeve holds another arm (with a terminal hitch ball) capable of extending rearwardly toward a trailer tongue. The hitch ball may therefore be manually extended rearwardly, and pivoted to positioning beneath a trailer tongue within its sweep. The Dugger patent does not allow the user to mechanically pull the mated tongue-and-ball (and trailer) to any locked towing configuration. Moreover, the relatively short distance between the ground and the Dugger trailer hitch creates a clearance problem for many towing vehicles attempting to access boat loading ramps or attempting to navigate similar terrain.

BRIEF SUMMARY OF THE INVENTION

Although the extendable trailer hitching machine of the present invention has several embodiments, the invention described essentially comprises a means of anchoring (to the back of the towing vehicle) a means of pulleying the trailer, and a hitch ball yoked to the pulleying means and engaged with the trailer.

One primary object of the present invention is to provide a trailer hitching machine that allows greater room for alignment of a hitch and trailer, by providing increased rearward extension and side-to-side sweep for the hitch ball in infinitely variable increments.

Another primary object of the present invention is to provide a trailer hitching machine that facilitates movement of the trailer to the towing vehicle to achieve the final locked towing position.

It is another object of the present invention to provide a trailer hitching machine that minimizes the time and effort required to hitch a trailer to a towing vehicle and commence fully-locked towing, especially minimizes the number of times the user must get into and out of the towing vehicle before commencing such towing.

It is another object of the present invention to provide a trailer hitching machine having sufficient clearance above the ground to reduce the incidents of contact between the ground and the hitching machine mated to the trailer tongue.

It is another object of the present invention to provide a trailer hitching machine providing rearward and sideways extension in infinitely variable increments accomplished using rigid structural elements.

It is another object of the present invention to provide a trailer hitching machine wherein extended rigid structural elements may essentially be pivoted or rotated to form a compact, retracted configuration capable of pulling a trailer into towing proximity with a towing vehicle.

Other objects will be apparent from a reading of the written description disclosed herein, together with the claims.

BRIEF DESCRIPTION OF THE SEVERAL VIEWS OF THE DRAWINGS

FIGS. 1 through 23 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

Figure 1:
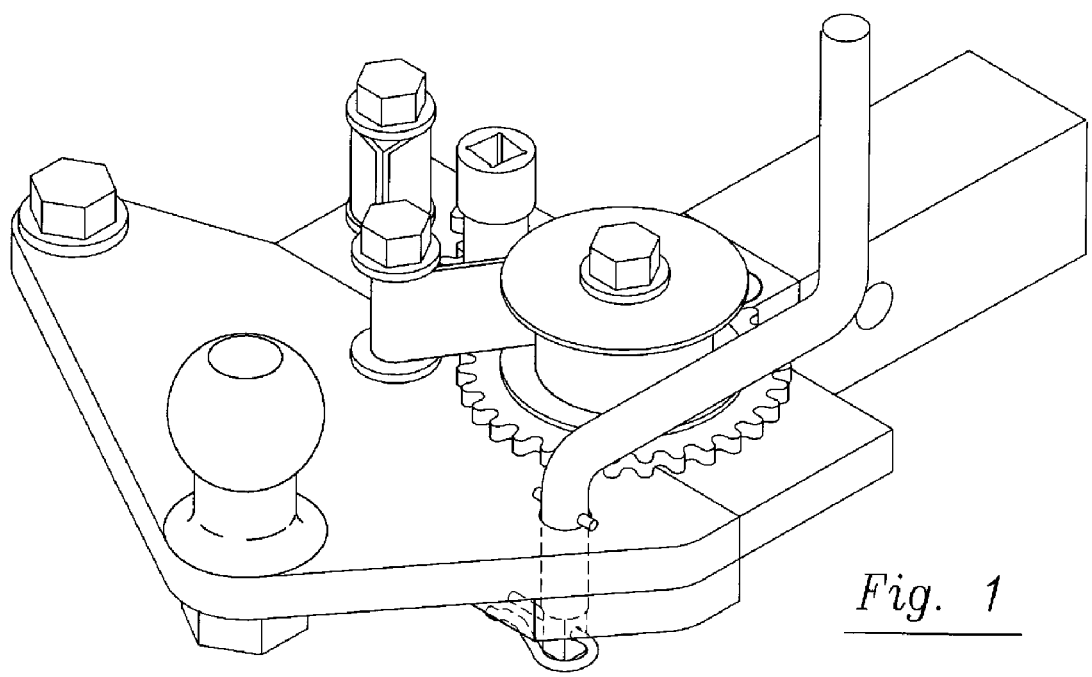
FIG. 1 depicts a perspective view of the invention in its fully retracted, locked towing configuration.
Figure 2:
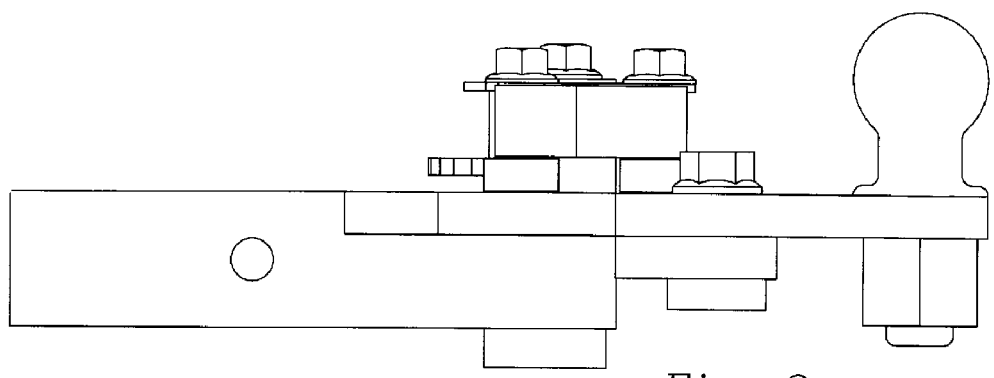
FIG. 2 depicts an elevation view of the left side of the invention of FIG. 1, without the inserted crank handle.
Figure 3:
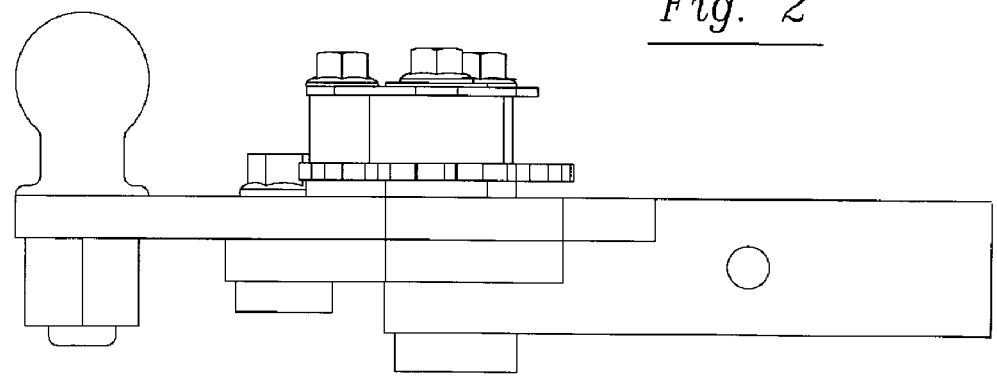
FIG. 3 depicts an elevation view of the right side of the invention of FIG. 1, without the inserted crank handle.
Figure 4:
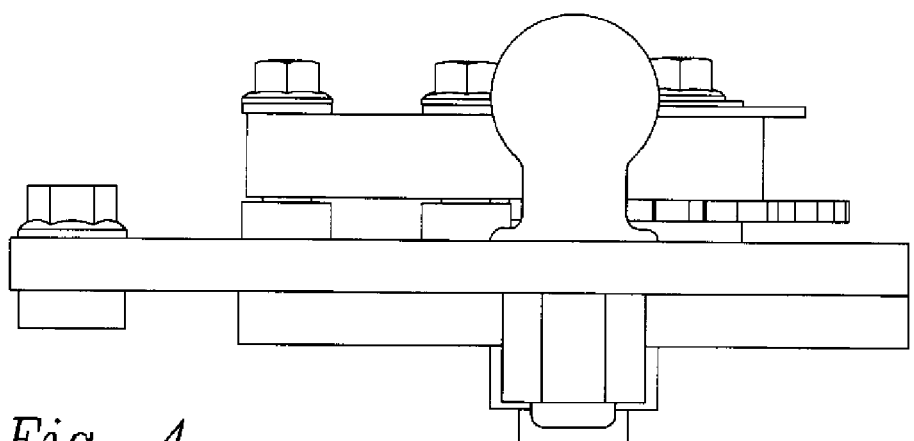
FIG. 4 depicts an elevation view of the rearward of the invention of FIG. 1, without the inserted crank handle.
Figure 5:
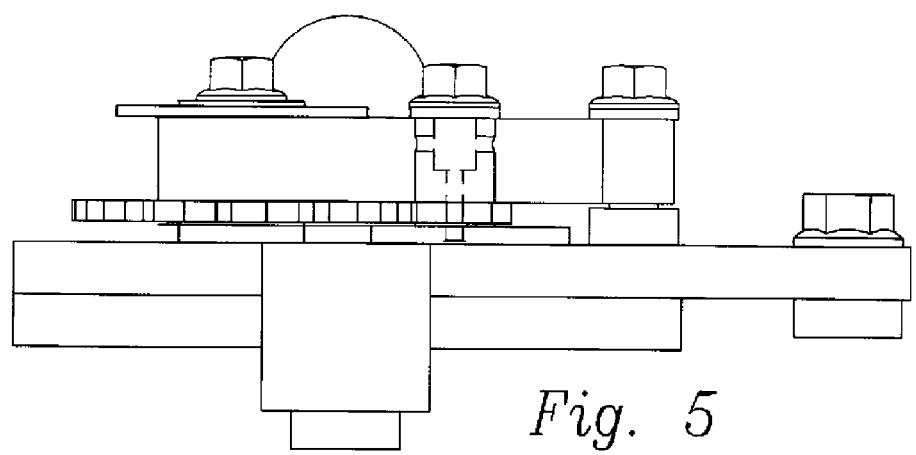
FIG. 5 depicts an elevation view of the forward of the invention of FIG. 1, without the inserted crank handle.
Figure 6:
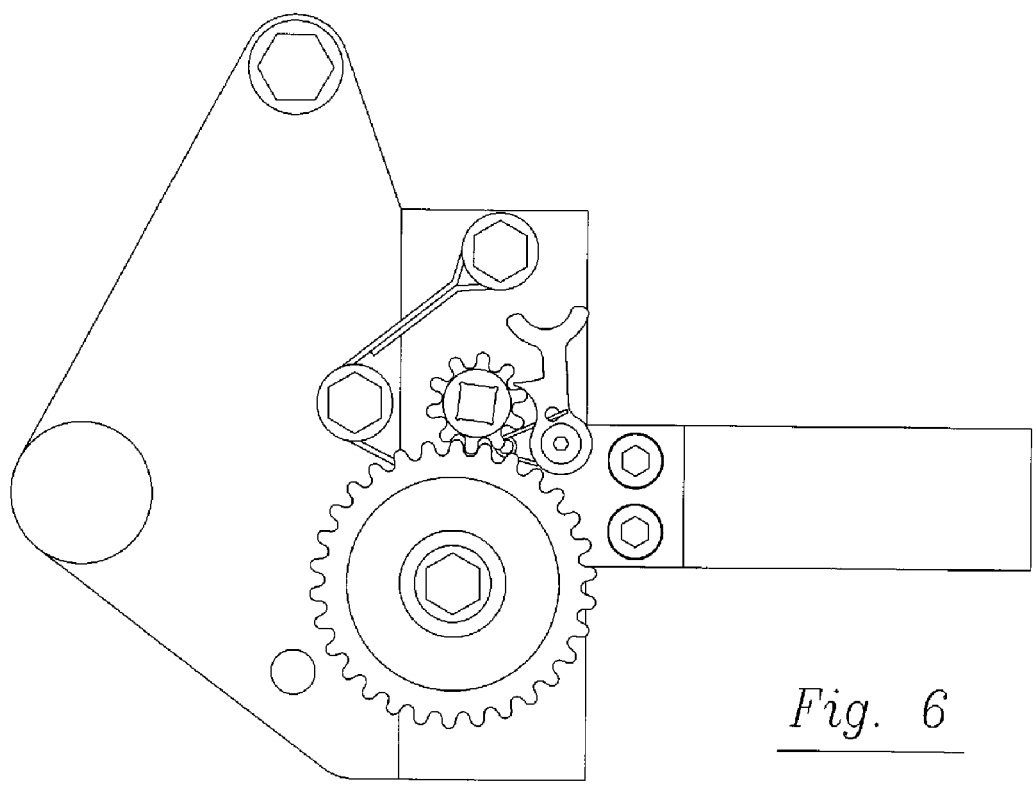
FIG. 6 depicts a top plan view of the invention of FIG. 1, without the inserted crank handle.
Figure 7:
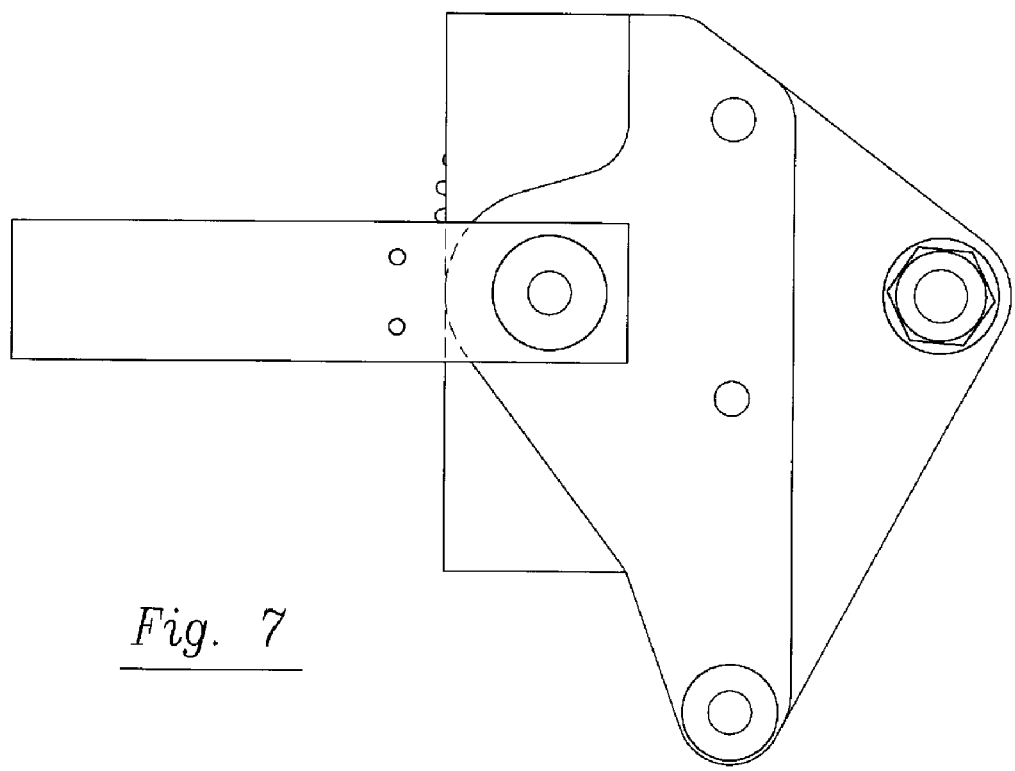
FIG. 7 depicts a bottom plan view of the invention of FIG. 1, without the inserted crank handle.
Figure 8:
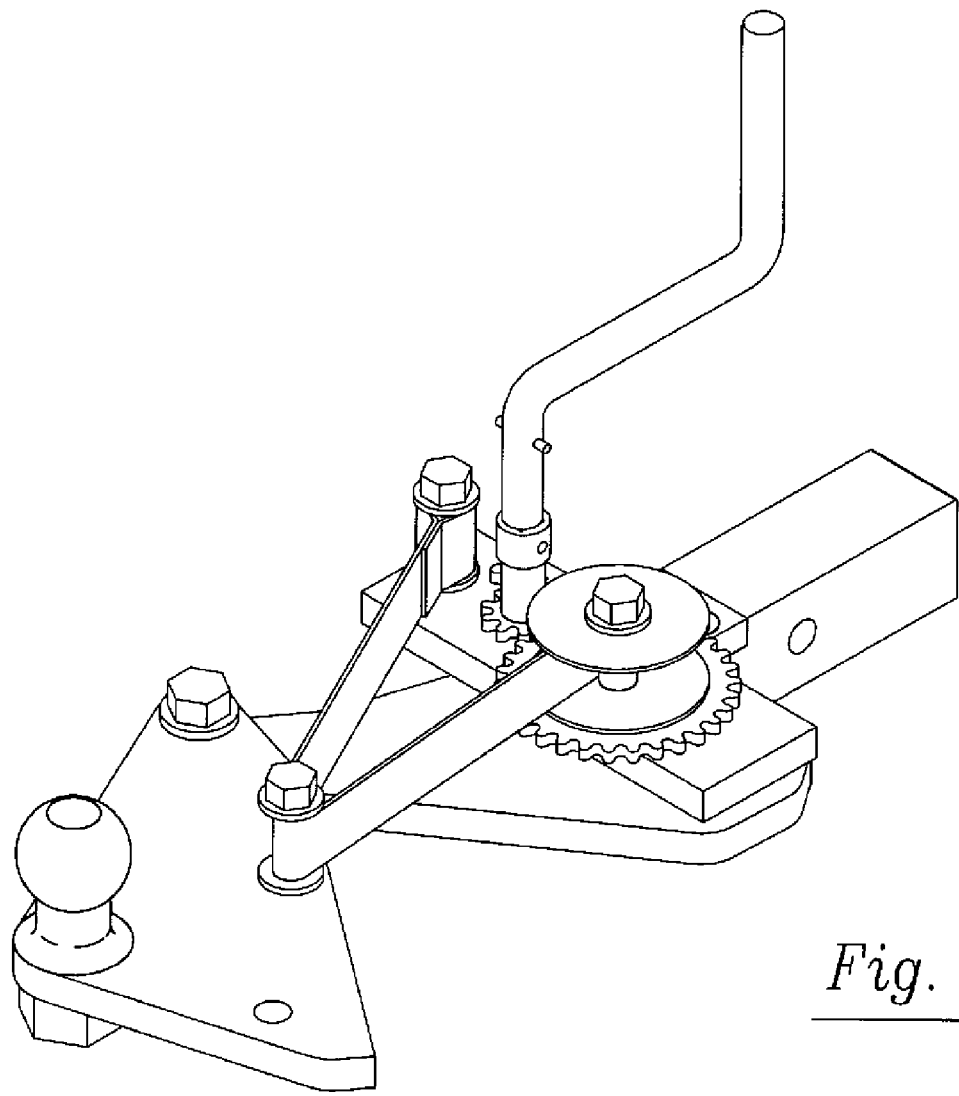
FIG. 8 depicts a perspective view of the invention of FIG. 1 after it is fully extended straight rearward.
Figure 9:
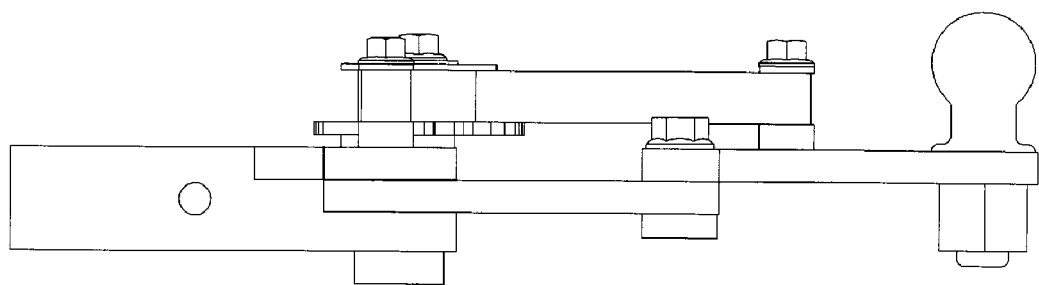
FIG. 9 depicts an elevation view of the left side of the invention of FIG. 8, without the inserted crank handle.
Figure 10:
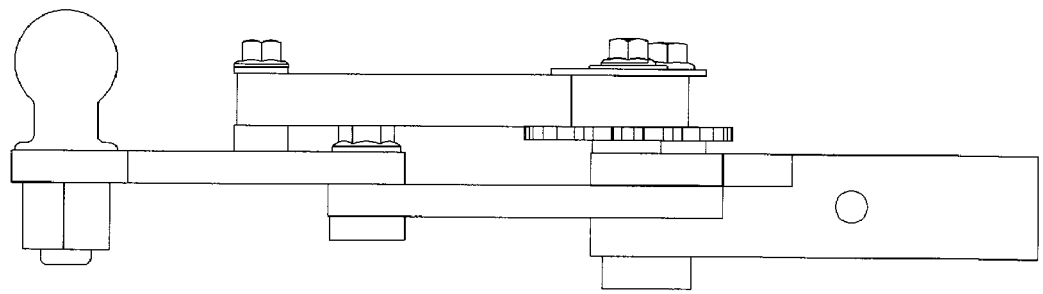
FIG. 10 depicts an elevation view of the right side of the invention of FIG. 8, without the inserted crank handle.
Figure 11:
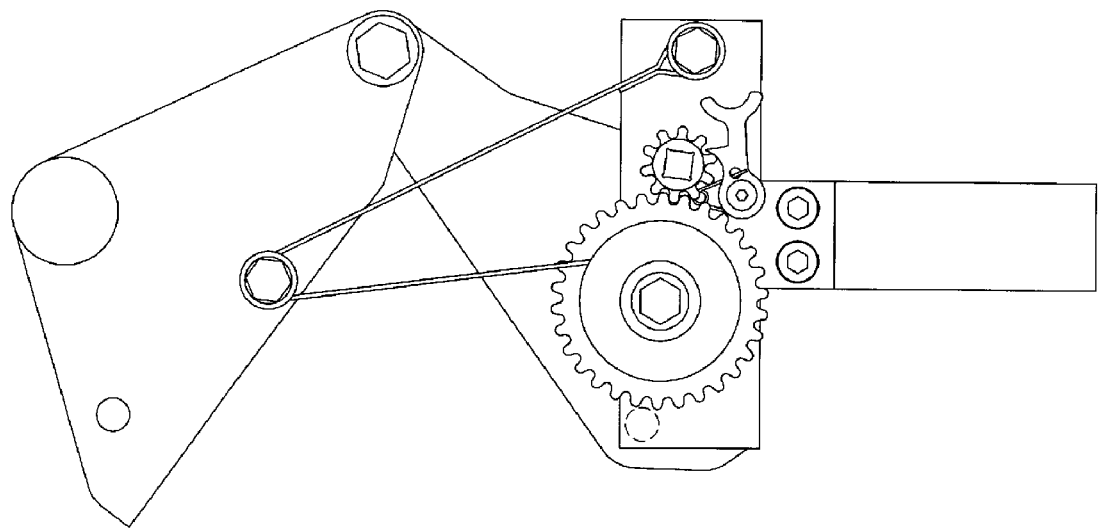
FIG. 11 depicts a top plan view of the invention of FIG. 8, without the inserted crank handle; the dashed circle next to the gearwheel depicts the fulcrum plate lock hole, beneath the anchor plate.
Figure 12:
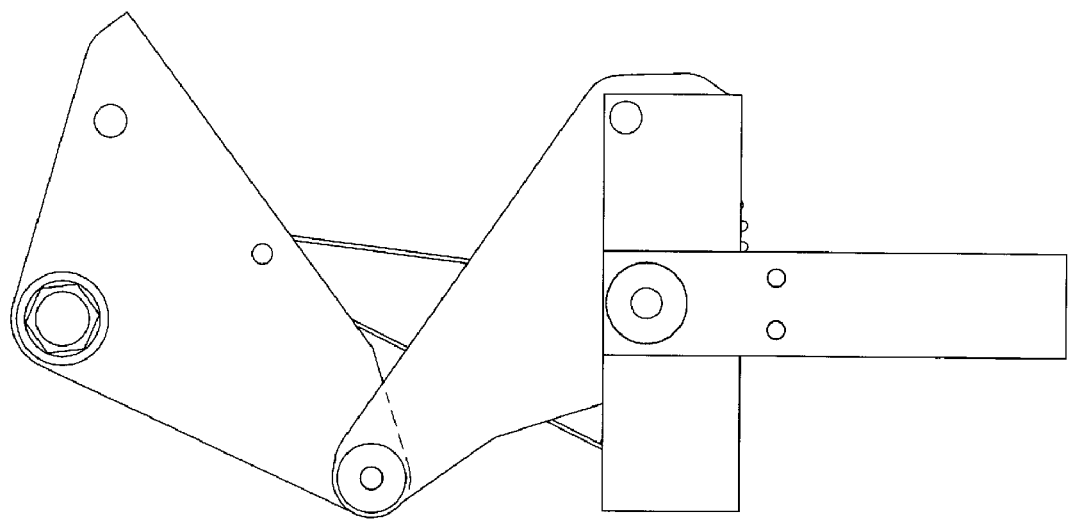
FIG. 12 depicts a bottom plan view of the invention of FIG. 8, without the inserted crank handle.
Figure 13:
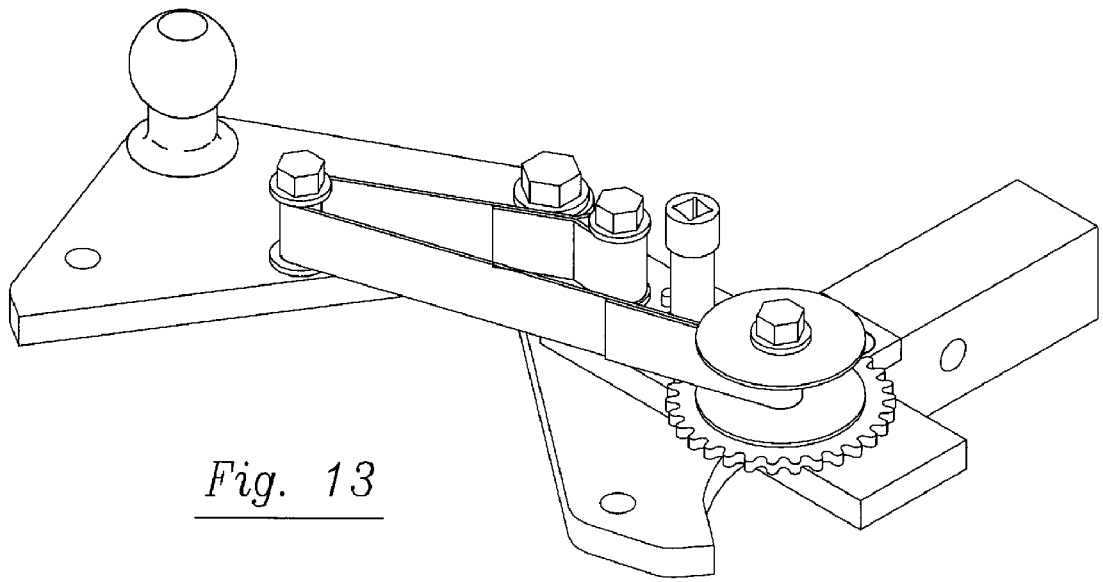
FIG. 13 depicts a perspective view of the invention of FIG. 8 after it is fully extended rearward to the left.
Figure 14:
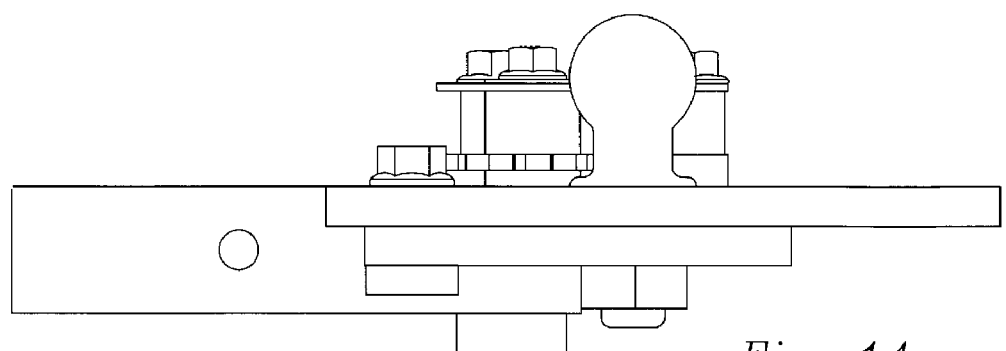
FIG. 14 depicts an elevation view of the left side of the invention of FIG. 13.
Figure 15:
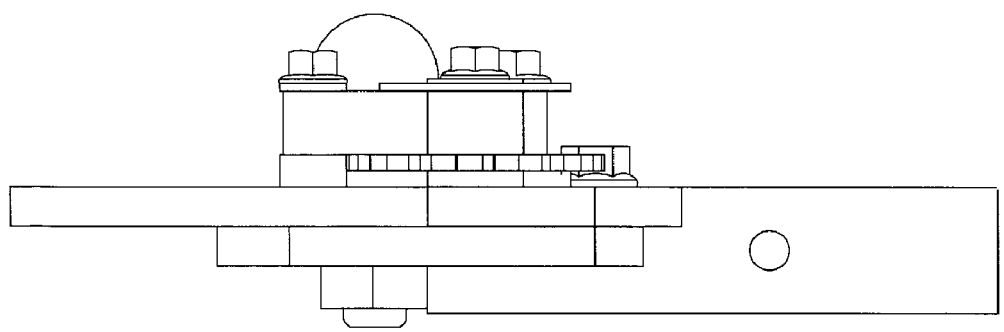
FIG. 15 depicts an elevation view of the right side of the invention of FIG. 13.
Figure 16:
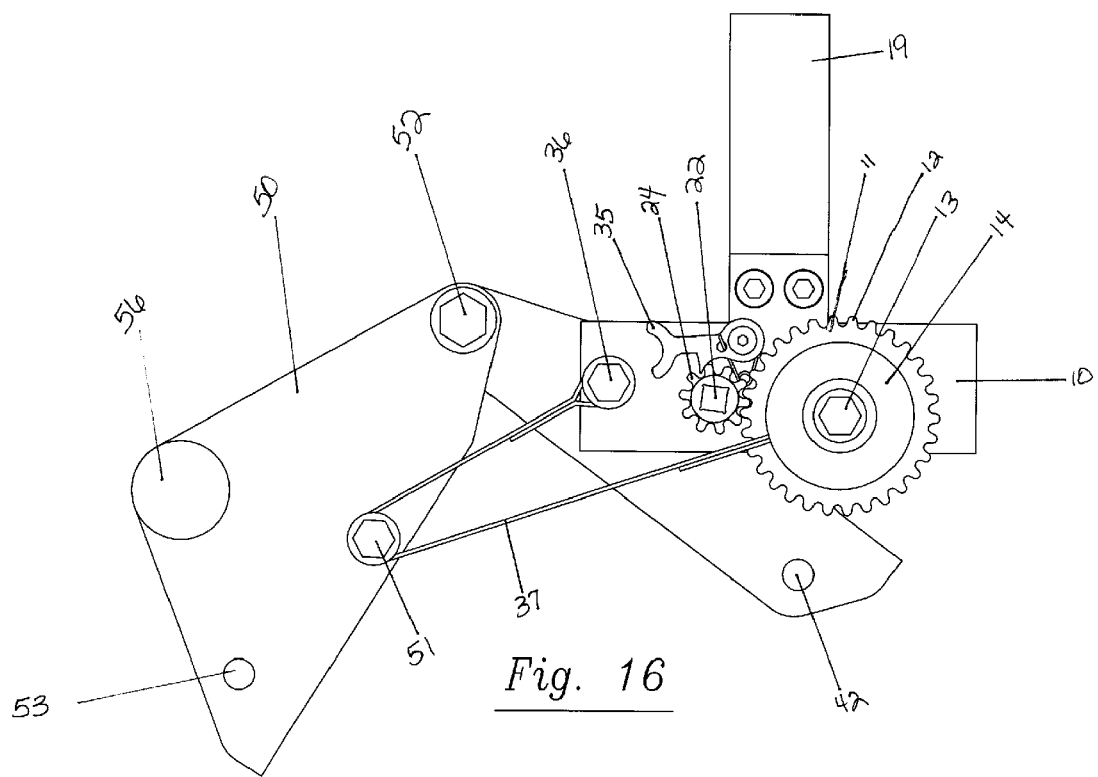
FIG. 16 depicts a top plan view of the invention of FIG. 13.
Figure 17:
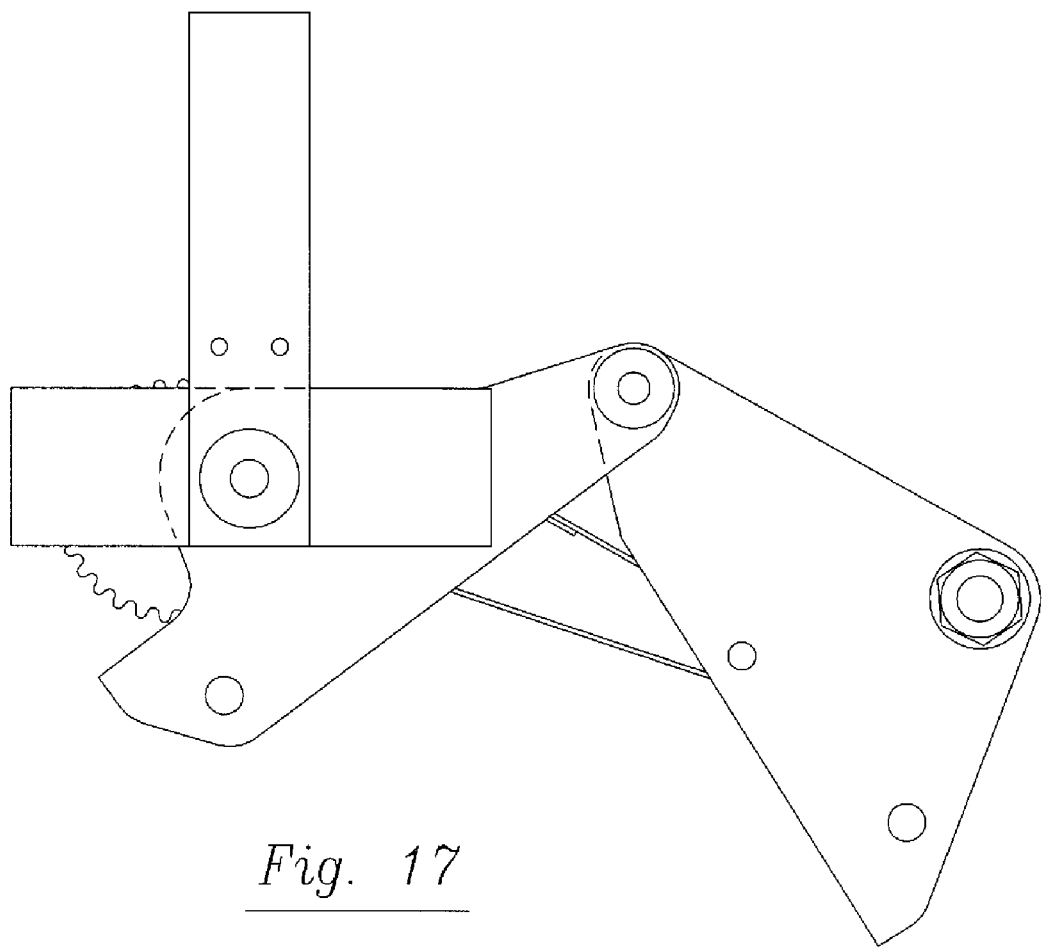
FIG. 17 depicts a bottom plan view of the invention of FIG. 13.
Figure 18:
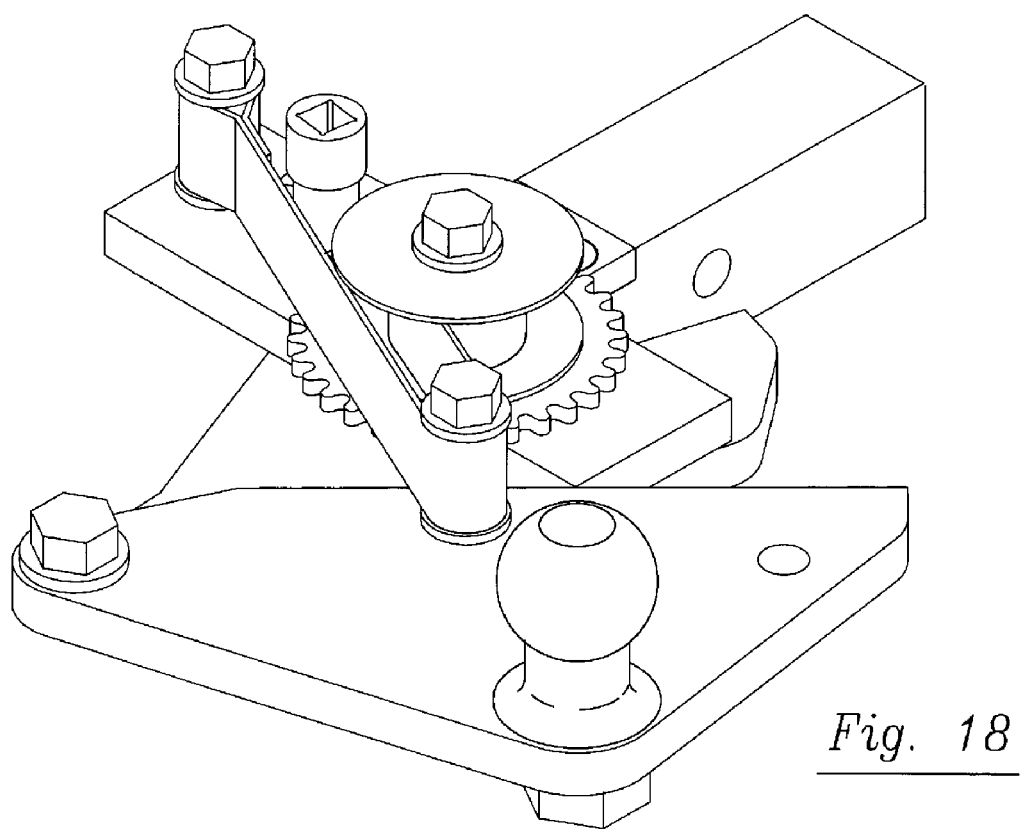
FIG. 18 depicts a perspective view of the invention of FIG. 8 after it is fully extended outward to the right.
Figure 19:
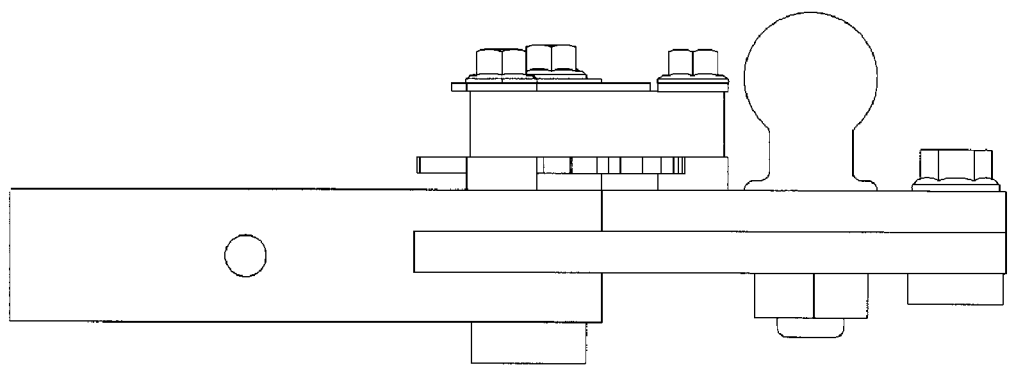
FIG. 19 depicts an elevation view of the left side of the invention of FIG. 18.
Figure 20:
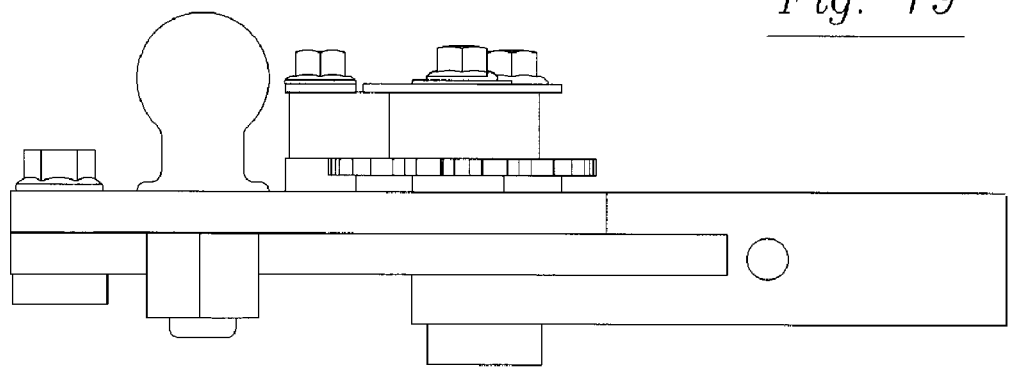
FIG. 20 depicts an elevation view of the right side of the invention of FIG. 18.
Figure 21:
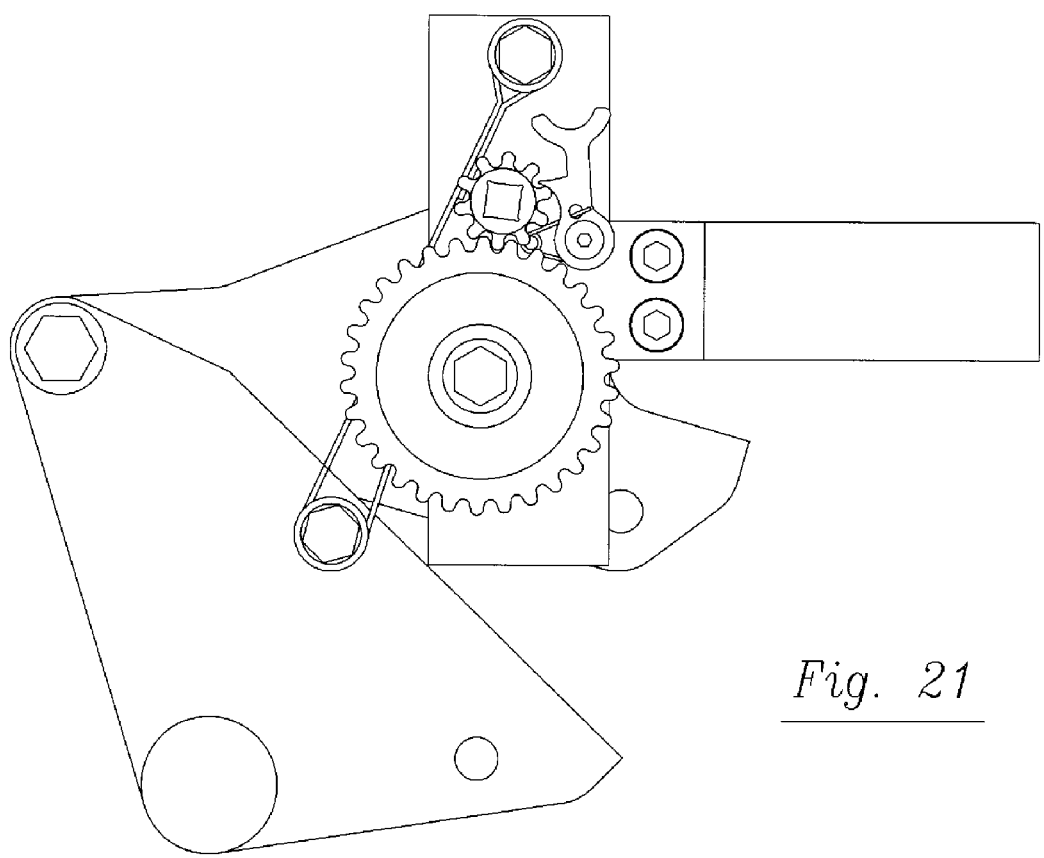
FIG. 21 depicts a top plan view of the invention of FIG. 18.
Figure 22:
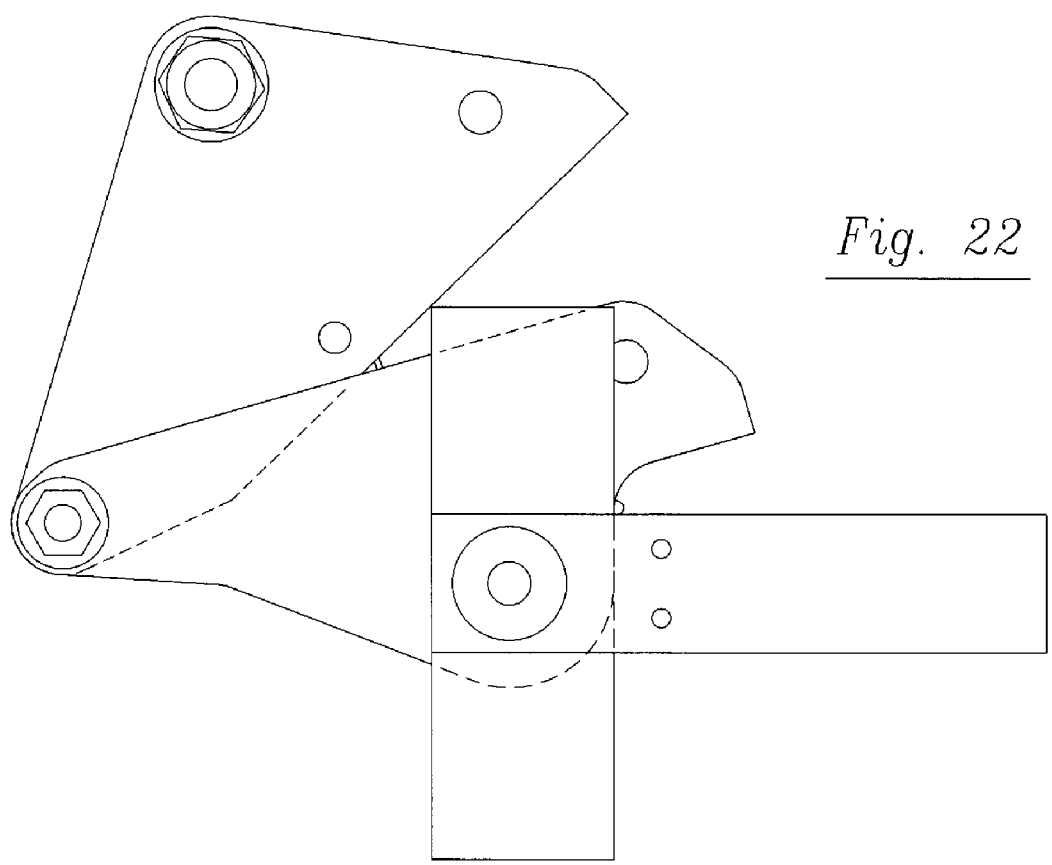
FIG. 22 depicts a bottom plan view of the invention of FIG. 18.
Figure 23:
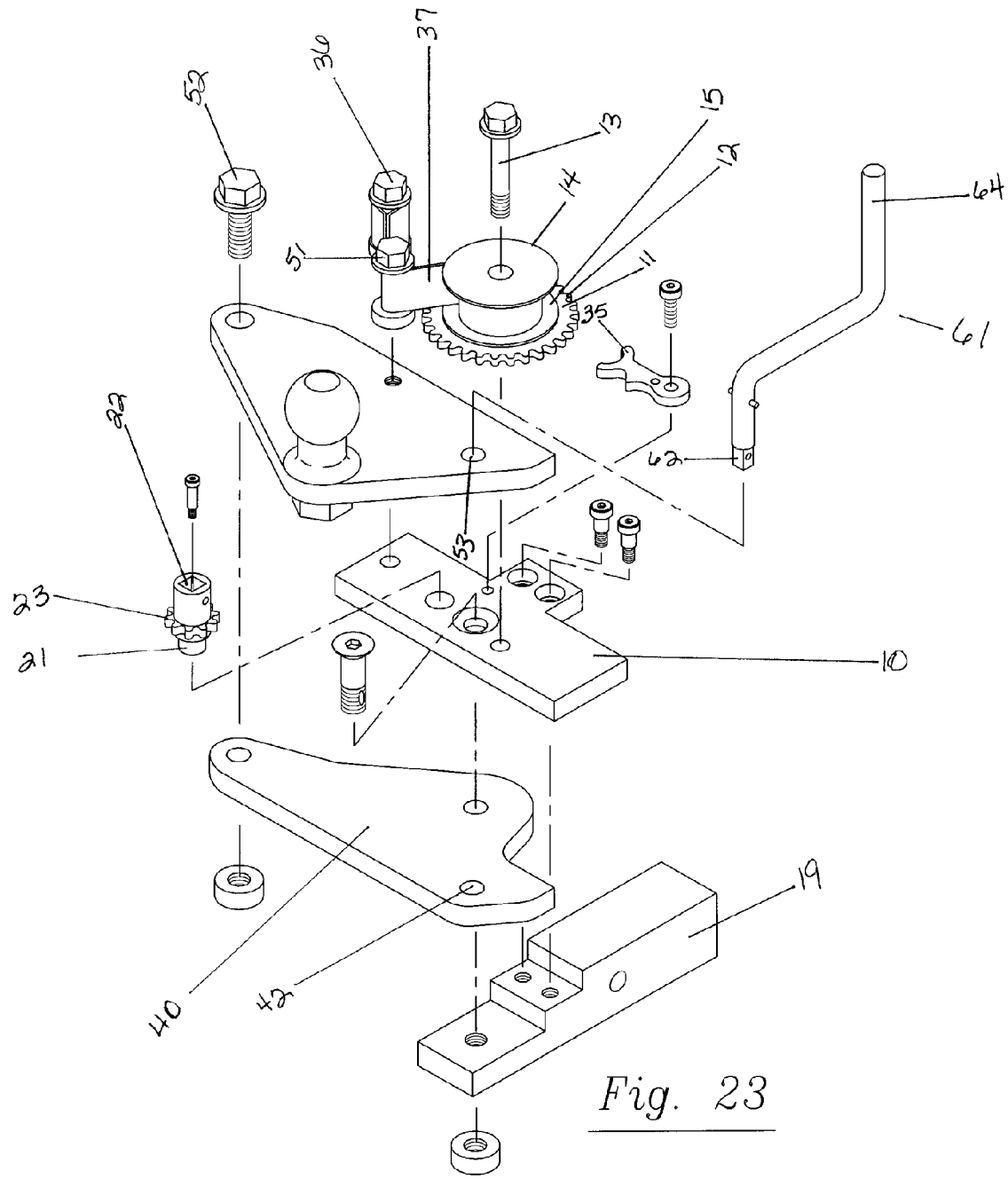
FIG. 23 depicts an exploded view of the invention of FIG. 1.

For the sake of simplicity and to give the claims of this patent application the broadest interpretation and construction possible, the following definitions will apply:

The term "rearward" essentially means behind the back end of the towing vehicle, or further in that direction relative to another reference point; rearward may also include sideways sweep, left or right, primarily behind the back end of the towing vehicle but possibly forward of the hitch ball in its fully retracted and locked position.

The term "forward" essentially means toward the front end of the towing vehicle, or further in that direction relative to another reference point.

The term "yoked" essentially means having movement restrained or controlled by, such as (for example) restraining the rearward extension or similar movement of a hitch ball, by connecting elements or by mechanical linkage of rigid structural elements.

Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although plate material essentially comprises steel, it may include any material capable of providing the necessary structural rigidity and pulleying support. Such materials may include (for example) metals and alloys, polymers and plastics, and mixtures and combinations thereof.

The most general form of the extendable trailer hitching machine for coupling a trailer to the back of a towing vehicle and for towing the trailer includes (comprises) a means of anchoring (to the back of the towing vehicle) a means of pulleying the trailer, and a trailer capturing member such as a hitch ball (for trailers having a tongue and socket for coupling with the towing vehicle) yoked to the pulleying means and engaged with the trailer. The anchoring means and pulleying may include any capable of accomplishing and maintaining the necessary structural function and the retraction of the trailer hitching machine. Actuating the pulleying means pulls the trailer hitching machine from a configuration wherein the hitch ball is extended rearward and/or sideways (and coupled with the trailer socket), to a retracted configuration with the hitch ball closer to the towing vehicle for towing the trailer. The pulley actuating means may include any capable of retracting the hitching machine when coupled to a trailer.

More particularly, the trailer hitching machine includes a pivot plate in cooperating relationship with (and extendable rearward from) the anchoring means, and supporting a pulley post and the hitch ball. The cooperating relationship is typically a mechanical linkage of rigid supportive plates. The anchoring means may include an anchor plate having a forward end affixed to the towing vehicle, and a rearward portion supporting the pulleying means. The pulleying means may include (a) a pulley wheel having an axle anchored to the anchor plate; (b) an anchor post anchored to the anchor plate; and (c) an elongate pulling member having a first end affixed to the axle and a second end affixed to the anchor post, an intermediate portion of the pulling member looping rearward around the pulley post anchored to the pivot plate. The elongate pulling member may include anything capable of accomplishing and maintaining the necessary pulling power to retract the extended trailer hitching machine when coupled to a trailer, including (without limitation) cable, rope, cord, strapping, chain and mixtures and combinations thereof.

In a more particular version of the trailer hitching machine, the pulley wheel may further include a pulley gearwheel having gear teeth; the pulley means may further include a cogwheel having cogs meshing with the gear teeth, the cogwheel axially rotating around a crank shaft. The elongate pulling member may include a pulley strap having a first end affixed to the gearwheel axle and a second end affixed to the anchor post, the pulley strap also having an intermediate portion slidably looped rearward around the pulley post on the pivot plate. The gearwheel may also include an outer pulley channel wall and an inner pulley channel wall aligned substantially parallel thereto, essentially forming a spool or channel around the gearwheel axle (but separate from the gear teeth) within which the pulley strap (or other elongate pulley member) may wind.

The crank shaft may be actuated by any means able to provide sufficient power to accomplish the axial rotation needed to actuate the pulleying of the trailer coupled to the hitching machine. The crank shaft may further include an end defining a mortise (or open-ended cavity); the hitching machine may further include a crank handle having one insertion end for insertion (or seating) within the mortise. The other end of the crank handle is configured for hand grasping, to accomplish manual actuation of the crank shaft and the pulley system mechanically linked thereto. Alternatively, the crank shaft may be actuated by motorized means.

The hitching machine may further include a pawl in cooperating relationship with the cogs, to restrain rotation of said cogwheel. Typically the pawl includes a spur capable of wedging between adjacent cogs, to prevent continued rotation of the cogwheel; the pawl often includes spring biasing toward the locking, wedged position. These features are generally known in the art of ratcheting systems, allowing control of pulleying or winding in one direction while preventing reversal.

The cooperating relationship between the anchoring means and the pivot plate, extendable rearward from the anchoring means, may include (intermediate between the anchor plate and the pivot plate) a fulcrum plate having a fixed end affixed to the anchor plate. The fulcrum plate supports the pivot plate by pivot hingepin attachment thereto. Alternatively, the fulcrum plate fixed end may be rotatably attached to the anchor plate by a fulcrum hingepin, with the fulcrum plate further including an arcing end arcing rearward as the fixed end rotates around the fulcrum hingepin; said arcing end supports the pivot hingepin and the pivot plate pivotally attached thereto.

The pivot plate may further include a sweep end supporting the hitch ball, the cooperative relationship between the anchor plate and the pivot plate (extendable rearward from the anchor plate) may further include additional rearward extension of the hitch ball as the pivot plate pivots around the pivot hingepin.

The rotatably attached fulcrum plate and the pivotally attached pivot plate may cooperate to enable the hitch ball to extend rearward from the anchor plate in the range of between about 0.01 inch and 14 inches directly rearward. More particularly, the rearward extension may extend about 7 inches directly rearward.

The rotatably attached fulcrum plate and the pivotally attached pivot plate may also cooperate to enable the hitch ball to extend rearward and sideward (diagonally left or right) from the anchor plate, at any angle and distance in the range of between about 0.01 inch and 25.25 inches. More particularly, at complete extension diagonally left and rearward, the hitch ball may be about three and five-eighths (3⅝) inches forward of the hitch ball in its fully retracted "home" position, and about twelve and five-eighths (12⅝) inches diagonally to the left. At complete extension diagonally right and rearward, the hitch ball may be about one and five-sixteenths (1 5/16) inches forward of the hitch ball in its fully retracted "home" position, and about seven and one-forth (7¼) inches diagonally to the right. Accordingly, within these approximate arc-sweep parameters, the user my actually back up "too close" to the trailer tongue (with its socket slightly forward of the hitch ball), without damaging the towing vehicle, and still be able to capture the hitch ball by the socket and return the hitching machine to its fully retracted towing configuration. These arcing sweep measurements are dependent upon the particular dimensions of the constituents of one prototype version; varying the overall size of the machine will likewise vary the arcing sweep measurements relating to rearward extension and side-to-side sweep of the hitch ball. The invention disclosed herein includes machines having much larger arcing sweep dimensions, produced by machines of correspondingly enlarged constituents.

In another version of the trailer hitching machine, the fulcrum plate may further include a hole, and the pivot plate may also further include a hole; both of the holes are aligned when the fulcrum plate is situated above the pivot plate, when the hitching machine is in its fully-retracted configuration. Both of the holes are sized to accept insertion of the crank handle insertion end, to prevent rotation of the fulcrum plate around the fulcrum hingepin and to prevent pivoting of the pivot plate around the pivot hingepin. The crank handle thereby doubles as a lockbar, preventing rearward expansion of the trailer hitching machine. The crank handle may also include a bore sized to accept insertion of the cotter pin, and prevent removal of the crank handle from insertion through the aligned holes. The bore preferably is through the insertion end.

In a most specific embodiment, the extendable trailer hitching machine includes:

an anchor plate (10) having one end for affixing to the towing vehicle, and a rearward portion supporting:

a pulley gearwheel (11) having an axle (13) anchored to the anchor plate, and having gear teeth (12);

an axially rotating crank shaft (21) comprising a cogwheel (23) having cogs (24) meshing with the gear teeth during the axial rotation, the crank shaft including an end defining a mortise (22) sized to accept insertion of an insertion end (62) of a crank handle (61) for actuating the axial rotation;

a pawl (35) for cooperating engagement with the cogs for restraining rotation of the cogwheel;

an anchor post (36) anchored to the anchor plate; and a pulley strap (37) having a first end affixed to the gearwheel axle and a second end affixed to the anchor post;

a fulcrum plate (40) extending rearward from the anchor plate and comprising a fixed end (43) rotatably attached to the anchor plate by a fulcrum hingepin (41), and an arcing end (44) arcing rearward as the fixed end rotates around the fulcrum hingepin, the arcing end supporting a pivot plate hingepin (52); and a pivot plate (50) pivotable rearward of the fulcrum plate and comprising a sweep end (55) supporting a hitch ball (56), a pivoting end (54) pivotally attached to the pivot plate hingepin, and a pulley post (51), the pulley strap having an intermediate portion slidably looped rearward around the pulley post.

The fulcrum plate may also include a fulcrum plate lock hole (42) and the pivot plate may also include a pivot plate lock hole (53), both of the holes aligned when the fulcrum plate is situated above the pivot plate when the hitching machine is in its fully-retracted configuration. Both holes are sized to accept insertion of the crank handle insertion end, to prevent rotation of the fulcrum plate around the fulcrum hingepin and to prevent pivoting of the pivot plate around the pivot hingepin, thereby preventing rearward expansion of the trailer hitching machine. The crank handle insertion end may also include a bore (63) sized to accept insertion of a cotter pin (65), thereby preventing removal of the crank handle from insertion through the aligned lock holes.

The anchor plate may also include a bumper receptacle insert (19) sized for snug insertion forwardly within a bumper hitch receptacle of the towing vehicle.

Although there may be some variation in assembly, one procedure is as follows. Insert the cogwheel shaft into the top side of the anchor plate. Place the cogwheel retaining washer into the counterbore on the bottom side of the anchor plate, and attach it to the bottom of the cogwheel shaft with a ¼"-20 flat head socket head cap screw. Torque it to 10 ft. lb.

Attach the anchor plate to the hitch insert with 2 ea. ½"-13 socket head cap screws. Torque to 90 ft. lb.

Apply Lubriplate (or similar grease) on the top surface of the hitch insert and on the bottom surface of the anchor plate, where the fulcrum plate will install. Insert the fulcrum plate between the anchor plate and the hitch insert. Apply Lubriplate to the unthreaded section of a ⅝"-11 flat head socket head cap screw and insert it through the anchor plate and the fulcrum plate, then thread it into the hitch insert. Tighten only enough to allow a snug slip fit (approx: 0.001"-0.002")

between the fulcrum plate and the hitch insert/anchor plate assembly. Note that some form of friction locking is required for that threaded joint. The bolt may have a nylon locking patch, the threads may be treated with medium strength thread locking compound at assembly (Loctite 242 or similar), or the threads may be machined to conform to $NC_5IF$ specifications (Interference Fit Threads).

Apply Lubriplate (or similar grease) on the top surface of the fulcrum plate and on the bottom surface of the pivot plate in the vicinity of the pivot hingepin. Attach the pivot plate above the fulcrum plate with a ⅝"-11 flanged head bolt (pivot hingepin), with the unthreaded surface coated with Lubriplate. Tighten only enough to allow a snug slip fit (approx: 0.001"-0.002") between the fulcrum plate and the pivot plate. Note that some form of friction locking is required for that threaded joint. The bolt may have a nylon locking patch, the threads may be treated with medium strength thread locking compound at assembly (Loctite 242 or similar), or the threads may be machined to conform to $NC_5IF$ specifications.

Insert the hooked end of the pawl spring into the ¼" diameter hole on the pawl. Insert the spring tail into the 0.08" diameter hole on the top side of the anchor plate and attach the pawl to the anchor plate with a ⅜" shoulder bolt (pawl pivot) so that the pawl spur engages the cogs of the cogwheel. The pawl spacer is placed between the pawl and the anchor plate. Torque to 10 ft. lb.

Insert the strap retaining dowel pin into the smaller of the loops on the pulley strap. Lubricate the top and bottom surfaces of the reel bottom spacer and place it over the ½"-13 threaded hole on the anchor plate. Lubricate the non-threaded surface of the ½"-13 flange head bolt (reel pivot or axle) with Lubriplate and assemble the reel top washer, reel top place, reel hub, and the reel bottom plate (reel gear) in that order on the reel pivot so that the 3/16" pin holes are aligned and adjacent to the reel hub flat section. Insert the strap/strap-retaining-dowel-pin assembly into the 3/16" pin holes adjacent to the reel hub flat section. Thread the reel pivot assembly into the anchor plate. Tighten only enough to allow a snug slip fit (approx: 0.001"-0.002") between the reel assembly and the anchor plate. Note that some form of friction locking is required for that threaded joint; the bolt may have a nylon locking patch, the threads may be treated with medium strength thread locking compound at assembly (Loctite 242 or similar), or the threads may be machined to conform to $NC_5IF$ specifications.

Insert a strap idler into the larger loop on the strap so that the strap idler flange is up. Place a ½'"-13 flange head bolt (anchor post) through the strap idler and through the idler spacer, then thread the assembly into the anchor plate. Torque to 80 ft. lb.

Coat the top and bottom of the second strap idler spacer with Lubriplate and coat the unthreaded section of the pulley post with Lubriplate. Insert the pulley post through the flanged end of the second strap idler and the strap idler spacer, then thread the assembly into the pivot plate. Tighten only enough to allow a snug slip fit (approx: 0.001"-0.002") between the strap idler assembly and the pivot plate. Note that some form of friction locking is required for that threaded joint; the bolt may have a nylon locking patch, the threads may be treated with medium strength thread locking compound at assembly (Loctite 242 or similar), or the threads may be machined to conform to $NC_5IF$ specifications. Place the strap to the rearward side of the strap idler assembly (pulley post).

Insert the crank handle into the cogwheel mortise and crank the cogwheel counterclockwise to wind the strap on to the reel and pull the pivot plate and fulcrum plate into the home position. Remove the crank handle from the cogwheel and insert it through the pair of aligned ⅝" diameter locking holes in the pivot plate and fulcrum plate, to put the hitching machine in its fully retracted and locked home position. Insert the cotterpin through the pin hole in the crank handle insertion end Besides the machine disclosed herein, the invention also includes a method of hitching a trailer to a towing vehicle. While not in use, the machine is typically removed from the vehicle and stored in its most compact, fully retracted configuration, which is also the locked towing configuration. In the locked, fully retracted configuration, the pulley strap is wound around the pulley channel of the gearwheel as completely as possible, so that the pivot plate is pulled atop the fulcrum plate and into the closest alignment with the coplanar anchor plate. The pawl of the ratchet is then engaged between adjacent cogs of the cogwheel to lock the cogwheel (and associated gearwheel) in place, and thereby lock the hitching machine in its fully retracted configuration. In fully locking the machine for towing a trailer, the user should also remove the end of the crank handle from its seat within the actuation end of the crankshaft, then insert that end of the crank handle through the aligned holes in the pivot plate and fulcrum plate, then insert a cotter pin through the bore through the end of the crank handle. This essentially converts the crank handle into a lock bar when towing a trailer, thereby providing the most support to the machine during towing.

In general, the method of using the machine includes the steps of positioning the hitch ball of the machine within the arc of approximately 12 inches left to approximately 7 inches rearward to approximately 7 inches right of the tongue of the trailer accepting the hitch ball, then positioning the hitch ball beneath the tongue before lowering it onto the hitch ball until fully mated, then manually rotating the crank handle a sufficient number of rotations until the machine is pulled into its fully retracted locking configuration for towing, the trailer thereby being drawn into the towing position. Again, these arcing sweep measurements are dependent upon the particular dimensions of the constituents of one prototype version; varying the overall size of the machine will likewise vary the arcing sweep measurements relating to rearward extension and side-to-side sweep of the hitch ball. The invention disclosed herein includes machines having much larger arcing sweep dimensions, produced by machines of correspondingly enlarged constituents.

More particularly, the driver of the towing vehicle backs the vehicle towards the trailer tongue until the hitch ball on the machine (usually still in its fully retracted towing configuration) is within the approximate arc no more than 7¼ inches left of the center of the trailer tongue, no more than 7 inches rearward of the center of the trailer tongue, nor more than 12⅛ inches right of the center of the trailer tongue. The user removes the crank handle from its locking position by removing the cotter pin from the bore through the end of the crank handle extending through the pivot plate, and pulls the crank handle up through the aligned holes through the pivot plate and fulcrum plate. The user then disengages the pawl from the cogs of the cogwheel to unlock the cogwheel (and associated gearwheel), grabs the hitch ball, and pulls the hitch ball into positioning beneath the trailer tongue. After lowering the tongue over the ball and establishing a mating engagement, the user positions the crank handle to actuate the ratchet and pulley systems, by inserting the insertion end of the crank handle into its seat within the mortise end of the crankshaft.

To draw the trailer tongue into the fully retracted towing position, the user rotates the crank handle a sufficient number of rotations until the pulley strap is wound around the pulley channel of the gearwheel as far as necessary. To prevent the trailer from rolling away from the vehicle, it is advisable for the user to re-engage the pawl of the ratchet between adjacent cogs of the cogwheel to again lock the cogwheel (and associated gearwheel) in place. To lock the trailer hitch machine in its fully retracted towing configuration, remove the crank handle from its seat within the actuation end of the crank shaft, re-insert it through the aligned holes through the pivot plate and fulcrum plate, and re-insert the cotter pin through the bore through the end of the crank handle.

One version of the method of using the extendable trailer hitching machine includes the steps of:

backing the towing vehicle towards the trailer tongue socket until the hitch ball of the unlocked hitching machine is positionable beneath the socket;

positioning the hitch ball beneath the socket, and lowering the socket over the ball until establishing a mating engagement; and rotating the crank shaft a sufficient number of axial rotations until the pulley strap of the hitching machine is wound around the gearwheel as completely as necessary.

More particularly, the method of using the extendable hitching machine also includes the steps of:

after establishing a mating engagement between the hitch ball and trailer socket, inserting the crank handle insertion end into the mortise end of the crankshaft, and manually rotating the crank shaft a sufficient number of axial rotations until the pulley strap of the hitching machine is wound around the gearwheel as completely as necessary, engaging the pawl with the cogs if desired; and prior to commencing towing of the trailer, removing the crank handle from its seat within the mortise end of the crank shaft, inserting the crank handle insertion end through the aligned holes through the pivot plate and fulcrum plate, and inserting the cotter pin through the bore through the end of the crank handle insertion end.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

What is claimed is:

1. An extendable trailer hitching machine for coupling a trailer to the back of a towing vehicle and for towing the trailer, said trailer hitching machine comprising a means of anchoring to the back of the towing vehicle a means of pulleying the trailer, and a pivot plate in cooperating relationship extendable rearward from the anchoring means and supporting a pulley post and a hitch ball yoked to the pulleying means and engaged with the trailer, the anchoring means comprising an anchor plate having a forward end affixed to the towing vehicle, and a rearward portion supporting the pulleying means, the pulleying means comprising:
    (a) a pulley wheel having an axle anchored to the anchor plate,
    (b) an anchor post anchored to the anchor plate,
    (c) an elongate pulling member having a first end affixed to the axle and a second end affixed to the anchor post, an intermediate portion of the pulling member looping rearward around the pulley post anchored to the pivot plate, and
    (d) a fixed pivot-point relationship with the anchoring means,
whereupon actuating the pulleying means pulls the trailer hitching machine from a configuration wherein the hitch ball is extended rearward, to a retracted configuration with the hitch ball closer to the towing vehicle for towing the trailer.

2. A trailer hitching machine described in claim 1:
    (a) the pulley wheel further comprising a pulley gearwheel having gear teeth;
    (b) the pulley means further comprising a cogwheel having cogs meshing with the gear teeth, said cogwheel axially rotating around a crank shaft;
    (c) said elongate pulling member comprising a pulley strap having a first end affixed to the gearwheel axle and a second end affixed to the anchor post, the pulley strap having an intermediate portion slidably looped rearward around the pulley post on the pivot plate.

3. A hitching machine described in claim 2, the crank shaft further comprising an end defining a mortise, said hitching machine further comprising a crank handle having one insertion end for seating within the mortise, and a second crank end.

4. A hitching machine described in claim 2, the crank shaft actuated by motorized means.

5. A hitching machine described in claim 4, further comprising a pawl in cooperative relationship with said cogs to restrain rotation of said cogwheel.

6. A trailer hitching machine described in claim 5, the cooperating relationship extendable rearward from the anchoring means comprising, intermediate between the anchor plate and the pivot plate, a fulcrum plate having a fixed end affixed to the anchor plate, said fulcrum plate supporting the pivot plate by pivot hingepin attachment thereto.

7. A hitching machine described in claim 6, the fulcrum plate fixed end rotatably attached to the anchor plate by a fulcrum hingepin, the fulcrum plate further comprising an arcing end arcing rearward as the fixed end rotates around the fulcrum hingepin, said arcing end supporting the pivot hingepin and the pivot plate pivotally attached thereto.

8. A hitching machine described in claim 7, the pivot plate further comprising a sweep end supporting the hitch ball, the cooperating relationship extendable rearward from the anchor plate further comprising additional rearward extension of the hitch ball as the pivot plate pivots around the pivot hingepin.

9. A hitching machine described in claim 8, said cooperative relationship enabling the hitch ball to travel essentially anywhere in variable increments within a rearward arcing sweep defined by said cooperating relationship.

10. A hitching machine described in claim 9, the rotatably attached fulcrum plate and the pivotally attached pivot plate cooperating to enable the hitch ball to extend rearward at any diagonal angle or distance within the range of arcing sweep parameters of:
    (a) leftward, between about 2.72 and 7.25 inches forward of the hitch ball in its fully retracted position, and between about 9.47 and 25.25 inches diagonally to the left, to
    (b) straight rearward, between about 5.25 and 14 inches from the hitch ball in its fully retracted position, to
    (c) rightward, between about 0.98 and 2.63 inches forward of the hitch ball in its fully retracted position, and between about 5.44 and 14.5 inches diagonally to the right.

11. A hitching machine described in claim 10, the rotatably attached fulcrum plate and the pivotally attached pivot plate cooperating to enable the hitch ball to extend rearward at any diagonal angle or distance within arc-sweep parameters of:

(a) leftward, about three and five-eighths (3⅝) inches forward of the hitch ball in its fully retracted position, and about twelve and five-eighths (12⅝) inches diagonally to the left to (b) straight rearward, about 7.0 inches from the hitch ball in its fully retracted position, to (c) rightward, about one and five-sixteenths (1 5/16) inches forward of the hitch ball in its fully retracted position, and about seven and one-forth (7¼) inches diagonally to the right.

12. A hitching machine described in claim 7, the fulcrum plate further defining a hole and the pivot plate also further defining a hole, both of the holes aligned when the fulcrum plate is situated above the pivot plate when the hitching machine is in its fully-retracted configuration, both holes sized to accept insertion of the crank handle insertion end to prevent rotation of the fulcrum plate around the fulcrum hingepin and prevent pivoting of the pivot plate around the pivot hingepin, thereby preventing rearward expansion of the trailer hitching machine.

13. A hitching machine described in claim 12, further comprising a cotter pin, the crank handle insertion end further comprising a bore sized to accept insertion of the cotter pin and prevent removal of the crank handle from insertion through the aligned holes.

14. An extendable trailer hitching machine for coupling a trailer to the back of a towing vehicle, said trailer hitching machine comprising:

(a) an anchor plate having one end for affixing to the towing vehicle, and a rearward portion supporting:

(1) a pulley gearwheel having an axle anchored to the anchor plate, and having gear teeth;

(2) an axially rotating crank shaft comprising a cogwheel having cogs meshing with the gear teeth during the axial rotation, the crank shaft including an end defining a mortise sized to accept insertion of an insertion end of a crank handle for actuating the axial rotation;

(3) a pawl for cooperating engagement with the cogs for restraining rotation of the cogwheel;

(4) an anchor post anchored to the anchor plate; and (5) a pulley strap having a first end affixed to the gearwheel axle and a second end affixed to the anchor post;

(b) a fulcrum plate extending rearward from the anchor plate and comprising a fixed end rotatably attached to the anchor plate by a fulcrum hingepin, and an arcing end arcing rearward as the fixed end rotates around the fulcrum hingepin, the arcing end supporting a pivot plate hingepin; and (c) a pivot plate pivotable rearward of the fulcrum plate and comprising a sweep end supporting a hitch ball, a pivoting end pivotally attached to the pivot plate hingepin, and a pulley post, the pulley strap having an intermediate portion slidably looped rearward around the pulley post.

15. A hitching machine described in claim 14, the fulcrum plate further defining a hole and the pivot plate also further defining a hole, both of the holes aligned when the fulcrum plate is situated above the pivot plate when the hitching machine is in its fully-retracted configuration, both holes sized to accept insertion of the crank handle insertion end to prevent rotation of the fulcrum plate around the fulcrum hingepin and prevent pivoting of the pivot plate around the pivot hingepin, thereby preventing rearward expansion of the trailer hitching machine, the crank handle insertion end further comprising a bore sized to accept insertion of a cotter pin thereby preventing removal of the crank handle from insertion through the aligned holes.

16. A hitching machine described in claim 15, said anchor plate further comprising a bumper receptacle insert sized for snug insertion forwardly within a bumper hitch receptacle of the towing vehicle.

17. A method of using an extendable trailer hitching machine described in claim 14 comprising the steps of:

(a) backing the towing vehicle towards the trailer tongue socket until the hitch ball of the unlocked hitching machine is positionable beneath the socket;

(b) positioning the hitch ball beneath the socket, and lowering the socket over the ball until establishing a mating engagement; and (c) rotating the crank shaft a sufficient number of axial rotations until the pulley strap of the hitching machine is wound around the gearwheel to the extent necessary to enable the pulley-powered fixed-point pivoting to pull the trailer hitching machine to a retracted configuration with the hitch ball closer to the towing vehicle for towing the trailer.

18. The method of using the extendable hitching machine of claim 17, further comprising the steps of:

(a) after establishing a mating engagement between the hitch ball and trailer socket, inserting the crank handle insertion end into the mortise end of the crankshaft, and manually rotating the crank shaft a sufficient number of axial rotations until the pulley strap of the hitching machine is wound around the gearwheel to the extent necessary to enable the pulley-powered fixed-point pivoting to pull the trailer hitching machine to a retracted configuration with the hitch ball closer to the towing vehicle for towing the trailer, engaging the pawl with the cogs if so necessary; and (b) prior to commencing towing of the trailer, removing the crank handle from its seat within the mortise end of the crank shaft, inserting the crank handle insertion end through the aligned holes through the pivot plate and fulcrum plate, and inserting the cotter pin through the bore through the end of the crank handle insertion end.

* * * * *